(12) United States Patent
Ito et al.

(10) Patent No.: US 10,703,076 B2
(45) Date of Patent: Jul. 7, 2020

(54) ZIRCONIA COMPOSITION, ZIRCONIA SEMI-SINTERED BODY AND ZIRCONIA SINTERED BODY, AS WELL AS DENTAL PRODUCT

(71) Applicant: KURARAY NORITAKE DENTAL INC., Kurashiki-shi (JP)

(72) Inventors: Yoshihisa Ito, Miyoshi (JP); Yasutaka Kudo, Miyoshi (JP)

(73) Assignee: KURARAY NORITAKE DENTAL INC., Kurashiki-shi (JP)

(*) Notice: Subject to any disclaimer, the term of this patent is extended or adjusted under 35 U.S.C. 154(b) by 0 days.

(21) Appl. No.: 15/538,993

(22) PCT Filed: Dec. 25, 2015

(86) PCT No.: PCT/JP2015/086272
§ 371 (c)(1),
(2) Date: Jun. 22, 2017

(87) PCT Pub. No.: WO2016/104724
PCT Pub. Date: Jun. 30, 2016

(65) Prior Publication Data
US 2018/0002235 A1    Jan. 4, 2018

(30) Foreign Application Priority Data
Dec. 26, 2014    (JP) .................... 2014-265066

(51) Int. Cl.
*B32B 7/02* (2019.01)
*B32B 18/00* (2006.01)
(Continued)

(52) U.S. Cl.
CPC .............. *B32B 18/00* (2013.01); *A61C 7/14* (2013.01); *A61C 8/0012* (2013.01);
(Continued)

(58) Field of Classification Search
CPC . A61C 13/0022; A61C 13/082; A61C 13/083; A61C 13/09; A61C 7/14;
(Continued)

(56) References Cited

U.S. PATENT DOCUMENTS

| 8,034,264 B2 | 10/2011 | Ritzberger et al. |
| 8,541,329 B2 | 9/2013 | Ritzberger et al. |

(Continued)

FOREIGN PATENT DOCUMENTS

| JP | 11-00305 A | 4/1999 |
| JP | 2004-35332 A | 2/2004 |

(Continued)

OTHER PUBLICATIONS

Japanese Office Action dated Apr. 2, 2019 in Patent Application No. 2016-566525 (with unedited computer generated English translation), 14 pages.

(Continued)

*Primary Examiner* — Lawrence D Ferguson
(74) *Attorney, Agent, or Firm* — Oblon, McClelland, Maier & Neustadt, L.L.P.

(57) ABSTRACT

A zirconia composition, a zirconia semi-sintered body, a zirconia sintered body, and a dental product are provided. The zirconia sintered body contains 4 mol % to 7 mol % of yttria as stabilizer, and a shielding material. The zirconia sintered body comprises first region and second region having a higher content ratio of the shielding material than the first region. Difference between content ratio of yttria in the first region and that of yttria in the second region is 1 mol % or less.

12 Claims, 4 Drawing Sheets

(51) Int. Cl.
*A61C 7/14* (2006.01)
*A61C 13/083* (2006.01)
*A61C 13/08* (2006.01)
*C04B 35/486* (2006.01)
*A61C 8/00* (2006.01)
*A61C 13/00* (2006.01)
*A61C 13/09* (2006.01)

(52) U.S. Cl.
CPC .......... *A61C 13/082* (2013.01); *A61C 13/083* (2013.01); *C04B 35/486* (2013.01); *A61C 13/0022* (2013.01); *A61C 13/09* (2013.01); *C04B 2235/3217* (2013.01); *C04B 2235/3225* (2013.01); *C04B 2235/3232* (2013.01); *C04B 2235/3239* (2013.01); *C04B 2235/3246* (2013.01); *C04B 2235/3248* (2013.01); *C04B 2235/3279* (2013.01); *C04B 2235/3418* (2013.01); *C04B 2235/9653* (2013.01); *C04B 2235/9661* (2013.01)

(58) Field of Classification Search
CPC .................. A61C 8/0012; B32B 18/00; C04B 2235/3217; C04B 2235/3225; C04B 2235/3232; C04B 2235/3239; C04B 2235/3246; C04B 2235/3248; C04B 2235/3279; C04B 2235/3418; C04B 2235/9653; C04B 2235/9661; C04B 35/486

See application file for complete search history.

(56) References Cited

U.S. PATENT DOCUMENTS

2007/0292597 A1 12/2007 Ritzberger et al.
2011/0319254 A1 12/2011 Ritzberger et al.

FOREIGN PATENT DOCUMENTS

| JP | 2007-126360 A | 5/2007 |
| JP | 2007-314536 A | 12/2007 |
| JP | 2008-222450 A | 9/2008 |
| KR | 10-1324467 B1 | 11/2013 |
| WO | 2014/181828 A1 | 11/2014 |

OTHER PUBLICATIONS

International Search Report dated Mar. 1, 2016 in PCT/JP2015/086272 filed Dec. 25, 2015.

ZIRCONIA COMPOSITION, ZIRCONIA SEMI-SINTERED BODY AND ZIRCONIA SINTERED BODY, AS WELL AS DENTAL PRODUCT

REFERENCE TO RELATED APPLICATION

The present invention is based on and claims the benefit of the priority of Japanese patent application No. 2014-265066 filed on Dec. 26, 2014, the disclosure of which is incorporated herein in its entirety by reference thereto.

The present invention relates to a zirconia sintered body. The present invention also relates to a zirconia composition and a zirconia semi-sintered body for producing the zirconia sintered body. In addition, the present invention relates to a dental product containing the zirconia sintered body.

BACKGROUND

Recently, as a dental prosthesis (such as cover crown, tooth crown, crown and post crown), ceramics such as zirconia is used as an alternative to metal from aesthetic and safety aspects.

Patent Literature 1 discloses a zirconia sintered body having an excellent translucency. Translucent yttria containing the zirconia sintered body disclosed in Patent Literature 1 is made of zirconia containing higher than 4 mol %, and 7 mol % or less of yttria, in which particle diameter of the sintered body is 2.0 µm or less, relative density is 99.5% or more, and total light transmittance for visible light having 600 nm of wavelength is 40% or more at 1 mm of thickness.

CITATION LIST

Patent Literatures

PATENT LITERATURE (PTL) 1: JP Patent Tokkai Publication No.

SUMMARY

Technical Problem

The following analyses are given from aspects of the present invention.

FIG. 4 shows a schematic view showing an example in which a dental prosthesis is used. In the example shown in FIG. 4, a zirconia sintered body is produced as the dental prosthesis (tooth crown) 201. The dental prosthesis 201 covers a patient's abutment tooth 202 which projects from a gum 203.

Usually, a natural tooth has increased transparency from a cervical part (a root side) to an incisal part (a tip side). In a case where the dental prosthesis 201 has the same transparency entirely, the dental prosthesis 201 looks unnatural when compared with adjacent natural teeth. Therefore, in order to produce a dental prosthesis 201 having transparency variation similar to the natural teeth, it is desired that transparency on the incisal side is higher than transparency on the cervical side.

The sintered body of partially stabilized zirconia has a tendency that transparency of zirconia sintered body increases when its content ratio of a stabilizer (particularly, yttria) is increased. However, difference in the content ratios of the stabilizer provides different contraction ratios of partially stabilized zirconia upon sintering. Therefore, when a zirconia sintered body is produced in which the content ratio of the stabilizer is partially varied so as to vary transparency, the zirconia sintered body has a defect due to partial difference in contraction ratio. Therefore, zirconia sintered body to be used as the dental prosthesis 201 cannot be produced by varying the content ratio of the stabilizer.

In addition, there are individual differences in color of an abutment tooth (particularly, depth in color). In a case where an abutment tooth 202 is dark, the abutment tooth 202 may be seen through from outside of the dental prosthesis 201 when the cervical side of the dental prosthesis 201 has a high transparency as disclosed in Patent Literature 1. In such case, a treated tooth (i.e. a part of the dental prosthesis 201) looks dark. Therefore, it is desired that transparency of the dental prosthesis 201 may be adjusted according to color of patient's abutment tooth.

Solution to Problem

According to a first aspect of the present invention, there is provided partially stabilized zirconia sintered body containing 4 mol % to 7 mol % of yttria as a stabilizer. The zirconia sintered body contains a light shielding material. The zirconia sintered body has a first region and a second region having a higher content ratio of the light shielding material than the first region. Difference between a content ratio of yttria in the first region and a content ratio of yttria in the second region is 1 mol % or less.

According to a second aspect of the present invention, there is provided a composition containing a partially stabilized zirconia containing 4 mol % to 7 mol % of yttria as a stabilizer and a light shielding material. The composition has a first region and a second region having a higher content ratio of the light shielding material than the first region. The light shielding material is at least one selected from a group comprising silicon oxide, aluminium oxide, titanium oxide, and complex oxide of zirconium and silicon.

According to a third aspect of the present invention, there is provided a semi-sintered (may be termed "calcined", too) body containing a partially stabilized zirconia containing 4 mol % to 7 mol % of yttria as a stabilizer and a light shielding material. The semi-sintered body has a first region and a second region having a higher content ratio of the light shielding material than the first region. The light shielding material is at least one selected from a group comprising silicon oxide, aluminium oxide, titanium oxide, and complex oxide of zirconium and silicon.

According to a fourth aspect of the present invention, there is provided a dental product containing the zirconia sintered body of the first aspect.

Advantageous Effects of the Invention

A zirconia sintered body having transparency variation similar to the transparency variation in natural teeth may be produced. A zirconia sintered body may be obtained, in which defect-generation is suppressed even if transparency is varied. In addition, a dental product may be produced, in which an abutment tooth is hardly seen-through according to the color of patient's abutment tooth while having an appearance equivalent to natural teeth.

DESCRIPTION OF EMBODIMENTS

Figure 1:
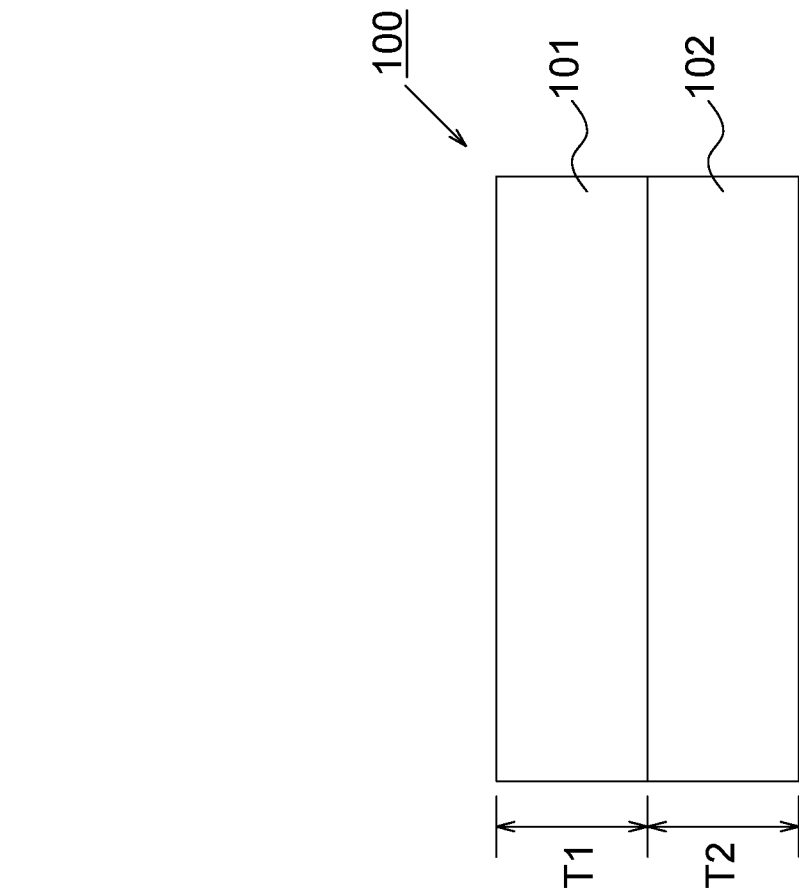
FIG. 1 is a schematic view showing an example of zirconia sintered body, semi-sintered body and composition according to a first exemplary embodiment of the present disclosure.

In the explanation below, reference symbols are attached for understanding the present invention, but not for limitation to the modes shown in the drawings. In each of the exemplary embodiments, the same symbols are attached to the same elements.

Preferable modes of each of the above aspects are described below.

According to a preferable mode in the first aspect, assume that L* value of color degree in L*a*b* color system measured on white background is defined as first L* value, L* value of color degree in L*a*b* color system measured on black background is defined as second L* value, and in a case where the value calculated by subtracting the second L* value from the first L* value is defined as ΔL, ΔL of a first region is larger than ΔL of a second region.

According to a preferable mode in the first aspect, ΔL of the first region is by 0.8 or more larger than ΔL of the second region.

According to a preferable mode in the first aspect, ΔL of the first region is 8 to 12, and ΔL of the second region is 4 to 11.

According to a preferable mode in the first aspect, ΔL of the second region is 7.5 or less.

According to a preferable mode in the first aspect, the first region and the second region are laminated (or stacked in layer).

According to a preferable mode in the first aspect, the zirconia sintered body further has a third region between the first region and the second region. ΔL of the third region is larger than ΔL of the second region and smaller than ΔL of the first region.

According to a preferable mode in the first aspect, a content ratio of the light shielding material in the third region is higher than the content ratio of the light shielding material in the first region and lower than the content ratio of the light shielding material in the second region.

According to a preferable mode in the first aspect, the zirconia sintered body further has a fourth region between the third region and the second region. ΔL of the fourth region is larger than ΔL of the second region and smaller than ΔL of the third region.

According to a preferable mode in the first aspect, a content ratio of the light shielding material in the fourth region is higher than the content ratio of the light shielding material in the third region and lower than the content ratio of the light shielding material in the second region.

According to a preferable mode in the first aspect, with respect to thickness in a laminated direction of each region, the thickness of the first region is 30% to 40% of a total thickness. The thickness of the second region is 30% to 40% of the total thickness. The thickness of the third region is 10% to 20% of the total thickness. The thickness of the fourth region is 10% to 20% of the total thickness.

According to a preferable mode in the first aspect, the light shielding material is at least one selected from a group comprising silicon oxide, aluminium oxide, titanium oxide, complex oxide of zirconium and silicon, coloring agent and fluorescence agent.

According to a preferable mode in the first aspect, the partially stabilized zirconia contains 5.3 mol % to 6.2 mol % of yttria as the stabilizer.

According to a preferable mode in the second aspect, the composition has a third region between the first region and the second region. A content ratio of the light shielding material in the third region is higher than a content ratio of the light shielding material in the first region and lower than a content ratio of the light shielding material in the second region.

According to a preferable mode in the second aspect, the composition further has a fourth region between the third region and the second region. A content ratio of the light shielding material in the fourth region is higher than content ratio of the light shielding material in the third region and lower than content ratio of the light shielding material in the second region.

According to a preferable mode in the second aspect, difference in the content ratios of yttria between each of regions is 1 mol % or less.

According to a preferable mode in the second aspect, the composition has a plate shape having a first surface and a second surface on an opposite side to the first surface. The first region is arranged on the side of the first surface. The second region is arranged on the side of the second surface.

According to a preferable mode in the third aspect, the semi-sintered body further has a third region between the first region and the second region. A content ratio of the light shielding material in the third region is higher than the content ratio of the light shielding material in the first region and lower than the content ratio of the light shielding material in the second region.

According to a preferable mode in the third aspect, the semi-sintered body further has a fourth region between the third region and the second region. A content ratio of the light shielding material in the fourth region is higher than the content ratio of the light shielding material in the third region and lower than the content ratio of the light shielding material in the second region.

According to a preferable mode in third aspect, fluctuation in content ratio of yttria in each of the regions is 1 mol % or less.

According to a preferable mode in the third aspect, the semi-sintered body has a plate shape having a first surface and a second surface on an opposite side to the first surface. The first region is arranged on the side of the first surface. The second region is arranged on the side of the second surface.

According to a preferable mode in the third aspect, there is provided a semi-sintered body obtained by firing the composition in the second aspect at 800° C. to 1200° C.

According to a preferable mode in the first aspect, there is provided a zirconia sintered body obtained by firing the composition in second aspect at 1400° C. or more.

According to a preferable mode in the first aspect, there is provided a zirconia sintered body obtained by firing the semi-sintered body in third aspect at 1400° C. or more.

According to a preferable mode in the fourth aspect, the dental product has a tooth crown shape.

According to a preferable mode in the fourth aspect, the first region is arranged on an incisal side of the tooth crown shape. The second region is arranged on a cervical side of the tooth crown shape.

According to a preferable mode in the fourth aspect, the second region covers at least a part of side surface of an abutment tooth.

According to a preferable mode in the fourth aspect, the dental product is a dental prosthesis, an orthodontic product or a dental implant product.

The zirconia sintered body according to the first exemplary embodiment of the present disclosure will be explained. The zirconia sintered body of the present disclosure is a sintered body in which zirconium dioxide ($ZrO_2$; zirconia) and partially stabilized zirconia crystal grains (particles) containing a stabilizer thereof are mainly sintered, containing the partially stabilized zirconia as a matrix phase. In the zirconia sintered body of the present disclosure, a main crystal phase of the zirconia has at least one of tetragonal system and cubic system. The zirconia may include both of the tetragonal system and the cubic system. It is preferable that the zirconia sintered body substantially has no monoclinic system at a stage before a hydrothermal treatment test.

The zirconia sintered body of the present disclosure comprises not only a sintered body in which formed (or shaped) zirconia particles are sintered under normal pressure or under no pressurization, but also a sintered body densified by a high-temperature pressurization process, such as HIP (Hot Isostatic Pressing) process.

The stabilizer in the partially stabilized zirconia is exemplified by oxides such as, for example, calcium oxide (CaO), magnesium oxide (MgO), yttrium oxide ($Y_2O_3$) (hereinafter, referred to as "yttria"), cerium oxide ($CeO_2$). It is preferable to use yttria in order to enhance transparency in the zirconia sintered body. In a case where yttria is used as the stabilizer, it is preferable that a content ratio of yttria is, for example, 4 mol % to 7 mol % relative to the partially stabilized zirconia, more preferably 5.3 mol % to 6.2 mol %. In a case of such content ratio, phase transition into monoclinic phase may be suppressed and transparency in the zirconia sintered body may be also enhanced. The content ratio of the stabilizer in the zirconia sintered body may be measured by, for example, ICP (Inductively Coupled Plasma) emission spectrometry analysis, fluorescent X-ray analysis and the like. Herein, the zirconia which has been partially stabilized by inclusion of the stabilizer is referred to as PSZ (Partially Stabilized Zirconia).

In the zirconia sintered body, it is preferable that the stabilizer is uniformly distributed. That is, in the zirconia sintered body, it is preferable that content ratio of the stabilizer is constant. For example, in the zirconia sintered body, it is preferable that the content ratio of the stabilizer is not varied stepwise or partially. Local difference in the content ratio of the stabilizer provides difference in a contraction ratio upon sintering, and provides defect(s) in the zirconia sintered body. It is preferable that fluctuation in the stabilizer (amount) is 1 mol % or less, more preferably, 0.5 mol % or less.

Transparency (translucency) of the zirconia sintered body may be represented by L* value as a color degree (color space) in the L*a*b* color system (JISZ8729). In the present disclosure, with respect to samples produced like as the following Examples, L* value in L*a*b* color system measured on white background (backboard) of the sample (an opposite side of a measuring apparatus relative to the samples is white) is defined as a first L* value. With respect to the same sample whose first L* value is measured, L* value in L*a*b* color system measured on black background (backboard) of the sample (an opposite side of a measuring apparatus relative to the samples is black) is defined as a second L* value. Difference between the first L* value and the second L* value (a value obtained by subtraction of the second L* value from the first L* value) is referred to as ΔL. In the present disclosure, transparency of the zirconia sintered body is represented by ΔL. The lager ΔL represents the higher transparency of the zirconia sintered body, and the smaller ΔL represents the lower transparency of the zirconia sintered body. As black and white to be background (backboard), a contrast ratio measuring sheet may be used, which is used for measurement of paint.

FIG. 1 shows a schematic view of an example of a zirconia sintered body of first exemplary embodiment in the present disclosure. The zirconia sintered body 100 comprises a first region 101 and a second region 102 which are different in transparency. The transparency of the first region 101 is higher than the transparency of the second region 102. It is preferable that ΔL of the first region 101 is, for example, 8 or more, and more preferably 9 or more. It is preferable that ΔL of the first region 101 is, for example, 12 or less, and more preferably 11 or less. It is preferable that ΔL of the second region 102 is, for example, 4 or more, and more preferably 6 or more. It is preferable that ΔL of the second region 102 is, for example, 11 or less, and more preferably 10 or less. In a desired case where the second region 102 has a transparency hardly allowing an abutment tooth to be seen-through, it is preferable that ΔL of the second region 102 is 7.5 or less, and more preferably 6.5 or less.

It is preferable that difference between ΔL of the first region 101 and ΔL of the second region 102 is 0.8 or more, more preferably 1 or more, more preferably 1.5 or more, and further preferably 2 or more. It is preferable that difference between ΔL of the first region 101 and ΔL of the second region 102 is 4 or less, and more preferably 3 or less.

It is preferable that the first region 101 and the second region 102 have a smaller difference in a content ratio of a stabilizer (for example, yttria). It is preferable that the difference in the content ratio of the stabilizer between the first region 101 and the second region 102 is 1 mol % or less, more preferably 0.5 mol %, and it is more preferable that no significant difference may be detected substantially.

It is preferable that the first region 101 and the second region 102 have a layered state. It is preferable that the first region 101 and the second region 102 are laminated (stacked in layers). It is preferable that, in the zirconia sintered body, transparency is stepwisely reduced from the first region 101 toward the second region 102.

The thickness of zirconia sintered body (T1+T2) may be, for example, 10 mm to 20 mm. A thickness T1 of the first region 101 may be 30% to 70% or 40% to 60% of the thickness (T1+T2) in the zirconia sintered body. A thickness T2 of the second region 102 may be 30% to 70% or 40% to 60% of the thickness (T1+T2) in the zirconia sintered body. Thereby, in a case where the zirconia sintered body is applied to a dental prosthesis, a dental engineer may easily adjust a range of the second region 102 hiding an abutment tooth according to the size of the abutment tooth.

A zirconia sintered body 100 may contain a shielding material for reducing transparency in the zirconia sintered body. It is preferable that a content ratio of the shielding material is partially or stepwisely modified. The second region 102 may contain a shielding material reducing transparency in the zirconia sintered body. The first region 101 may contain the shielding material. It is preferable that a content ratio of the shielding material has a stepwise reducing tendency from the second region 102 toward the side of the first region 101. It is preferable that a content ratio of the shielding material in the second region 102 is higher than a content ratio of the shielding material in the first region 101.

It is preferable that the shielding material does not dramatically reduce physical properties, such as strength and fracture toughness in the zirconia sintered body. As a shielding material, at least one selected from a group comprising, for example, silicon oxide ($SiO_2$; silica), aluminium oxide ($Al_2O_3$; alumina), titanium oxide ($TiO_2$; titania), complex oxide of zirconium and silicon (for example, zircon ($ZrSiO_4$)), coloring agent (pigment), and fluorescence agent may be used. As the coloring agent, oxide of at least one element selected from a group, for example, P, Ti, V, Cr, Mn, Fe, Co, Ni, Zn, Y, Zr, Sn, Sb, Bi, Ce, Pr, Sm, Eu, Gd, Tb and Er is exemplified. As the fluorescence agent, for example, $Y_2SiO_5$: Ce, $Y_2SiO_5$: Tb, (Y, Gd, Eu) $BO_3$, $Y_2O_3$: Eu, YAG: Ce, $ZnGa_2O_4$: Zn, $BaMgAl_{10}O_{17}$: Eu etc. are exemplified. The shielding material may be used as a combination of a plurality of compounds. The content ratio of the shielding material may be adjusted according to type of the shielding material.

The shielding material contained in the second region 102 and the shielding material contained in the first region 101 may be the same or different.

As for color degree (color space) in L*a*b* color system (JISZ8729) of the zirconia sintered body, it is preferable that L* value is within a range of 64 to 76. It is preferable that a* value is within −6 to 3, and b* value is within 3 to 27. Thereby, the zirconia sintered body may have a color similar to natural teeth.

According to a first exemplary embodiment, in a case where a color of an abutment tooth of a patient is dark (black), a dental prosthesis covering an abutment tooth with a low transparency region may be produced. In addition, a tendency in transparency variation in the dental prosthesis may imitate a tendency of a natural tooth in transparency variation.

Next, a zirconia sintered body of a second exemplary embodiment in the present disclosure will be explained. Although the zirconia sintered body having 2 regions has been explained in the first exemplary embodiment, a zirconia sintered body having 3 or more regions will be explained.

Figure 2:
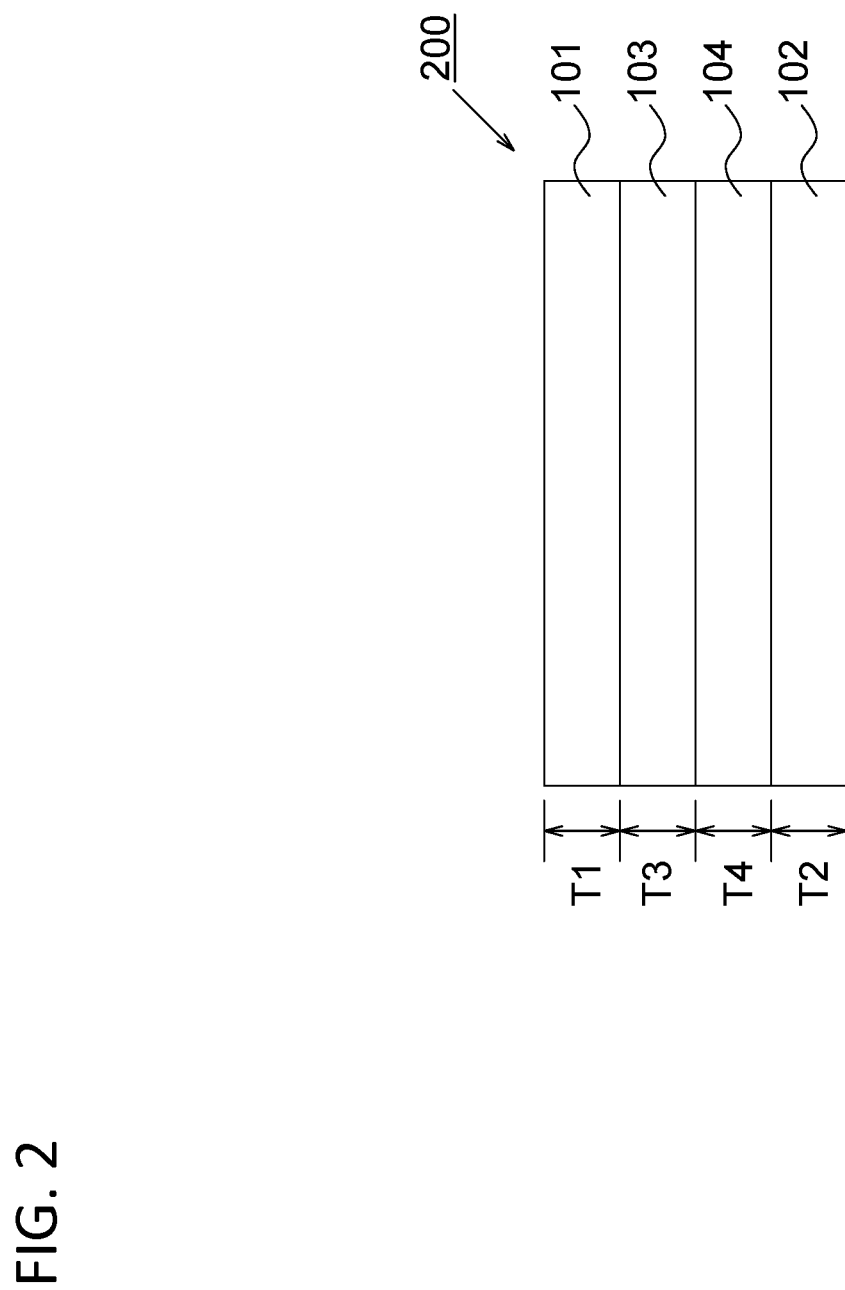
FIG. 2 is a schematic view showing an example of zirconia sintered body, semi-sintered body and composition according to a second exemplary embodiment of the present disclosure.

FIG. 2 shows a schematic view of an example of the zirconia sintered body according to the second exemplary embodiment of the present disclosure. In addition to the first region 101 and the second region 102, the zirconia sintered body 200 further comprises a third region 103 and a fourth region 104 between the first region 101 and the second region 102. In the zirconia sintered body 200 shown in FIG. 2, 4 regions have a layered state configuration, wherein the second region 102, the fourth region 104, the third region 103 and the first region 101 are laminated in this order.

A transparency in the first region 101 and the second region 102 may be similar to the first exemplary embodiment. It is preferable that the transparencies in the third region 103 and the fourth region 104 are lower than a transparency in the first region 101 and higher than a transparency in the second region 102. It is preferable that ΔL of each of the regions is reduced in an order from the first region 101 to the second region 102. Thereby, transparency variation similar to a natural tooth may be realized. It is preferable that the fourth region 104 has a transparency so as to hardly allow an abutment tooth to be seen-through.

It is preferable that a transparency in the third region 103 is lower than the transparency in the first region 101. It is preferable that a transparency in the fourth region 104 is lower than the transparency in the third region 103. It is preferable that the transparency in the second region 102 is lower than the transparency in the fourth region 104. For example, it is preferable that ΔL of the first region 101 is 8 or more, and more preferably 9 or more. It is preferable that ΔL of the first region 101 is 12 or less, and more preferably 11 or less. It is preferable that ΔL of the third region 103 is 5 or more, and more preferably 6 or more. It is preferable that ΔL of the third region 103 is 11 or less, and more preferably 10 or less. It is preferable that ΔL of the fourth region 104 is 6 or more, and more preferably 7 or more. It is preferable that ΔL of the fourth region 104 is 10 or less, and more preferably 9 or less. It is preferable that ΔL of the second region 102 is 7 or more, and more preferably 8 or more. It is preferable that ΔL of the second region 102 is 12 or less, and more preferably 11 or less. Thereby, the zirconia sintered body may have a transparency similar to a natural tooth.

It is preferable that ΔL of the third region 103 is by 0.3 or more smaller than ΔL of the first region 101, and more preferably by 0.5 or more smaller. It is preferable that ΔL of the fourth region 104 is by 0.3 or more smaller than ΔL of the third region 103, and more preferably by 0.5 or more smaller. It is preferable that ΔL of the second region 102 is by 0.2 or more smaller than ΔL of the fourth region 104, and more preferably by 0.3 or more smaller. Thereby, the zirconia sintered body may have a transparency variation similar to a natural tooth.

A thickness of the zirconia sintered body (a thickness in a lamination direction in each of regions: T1+T3+T4+T2) may be, for example, 10 mm to 20 mm. A thickness T1 of the first region 101 may be 30% to 40% of the thickness of zirconia sintered body (T1+T3+T4+T2). A thickness T3 of the third region 103 may be 10% to 20% of the thickness of the zirconia sintered body (T1+T3+T4+T2). A thickness T4 of the fourth region 104 may be 10% to 20% of the thickness of the zirconia sintered body (T1+T3+T4+T2). A thickness T2 of the second region 102 may be 30% to 40% of the thickness of the zirconia sintered body (T1+T3+T4+T2). Thereby, in a case where the zirconia sintered body is applied to a dental prosthesis, a dental engineer may easily adjust a range of the second region 102 hiding an abutment tooth according to a size of the abutment tooth.

Similarly to the first exemplary embodiment, each region may contain a shielding material. It is preferable that a content ratio has a stepwise reducing tendency from the second region 102 toward the first region 101. It is preferable that a content ratio of the shielding material in the second region 102 is higher than a content ratio of the shielding material in the fourth region 104. It is preferable that the content ratio of the shielding material in the fourth region 104 is higher than a content ratio of the shielding material in the third region 103. It is preferable that the content ratio of the shielding material in the third region 103 is higher than the content ratio of the shielding material in the first region 101.

Although FIG. 2 shows an exemplary embodiment where a zirconia sintered body 200 comprises 4 regions (layers), the number of regions is not limited to 4. The zirconia sintered body may comprise 3 regions, or 5 or more regions.

Modes of second exemplary embodiment other than above described exemplary embodiment may be those as the first exemplary embodiment.

According to the second exemplary embodiment, equivalent effects as the first exemplary embodiment may be obtained. According to the second exemplary embodiment, a dental prosthesis having more natural transparency variation may be produced.

Next, a zirconia sintered body according to a third exemplary embodiment of the present disclosure will be explained. Although the zirconia sintered body having laminated structure where each region has a flat plate shape has been explained in the first and second exemplary embodiments, a zirconia sintered body in which each region does not have a flat plate shape will be explained.

Figure 3:
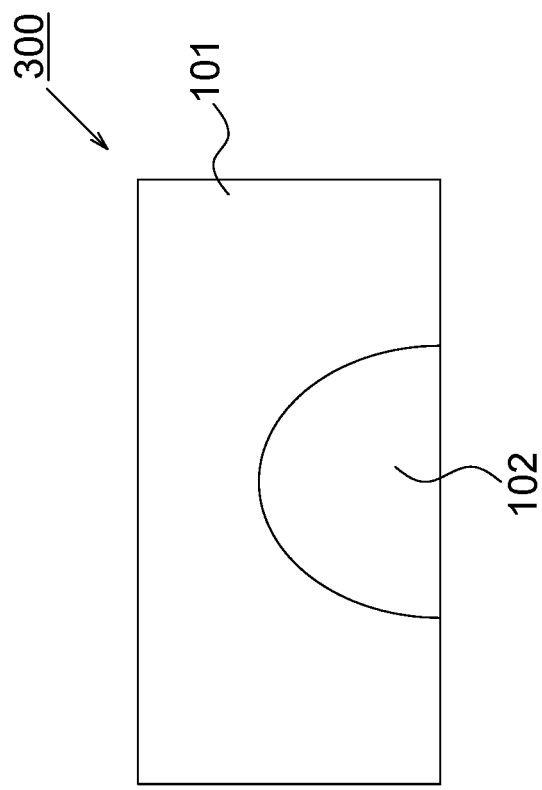
FIG. 3 is a schematic view showing an example of zirconia sintered body, semi-sintered body and composition according to a third exemplary embodiment of the present disclosure.
Figure 4:
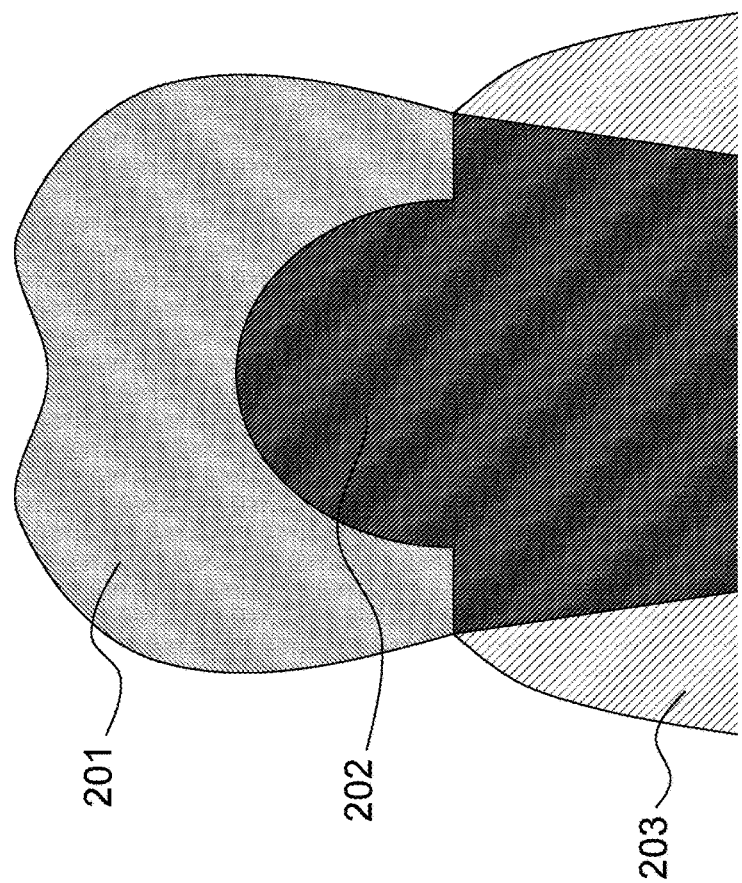
FIG. 4 is a schematic sectional view showing an example in which a dental prosthesis is used.

FIG. 3 shows a schematic view of an example of a zirconia sintered body according to the third exemplary embodiment of the present disclosure. A zirconia sintered body 300 comprises a first region 101 and a second region 102. Transparencies of the first region 101 and second region 102 may be similar to those of the first exemplary embodiment.

For example, the second region 102 may have a configuration covering a side surface of an abutment tooth. For example, in a mode shown in FIG. 3, the second region 102 has a semicircular configuration or a semi-ellipsoid configuration. Thereby, when the zirconia sintered body 300 is produced as a dental prosthesis, an abutment tooth may be hardly seen-through by covering with the second region 102 having a low transparency.

Modes of the third exemplary embodiment other than above described modes may be those as the first exemplary embodiment.

According to the third exemplary embodiment, equivalent effect to the first exemplary embodiment may be obtained. According to the third exemplary embodiment, a dental prosthesis capable of hiding an abutment tooth with a region having a low transparency may be produced.

In the exemplary embodiments, it is unnecessary that variations in transparency and content ratio of the shielding material between adjacent regions form an apparent boundary, thus it may be successive.

Next, a composition and a semi-sintered (or calcined) body for producing the zirconia sintered body of the present disclosure will be explained. The composition and semi-sintered body are those to be a precursor(s) (intermediate product(s)) of the above zirconia sintered body of the present invention. The semi-sintered body is those subjected to firing (or burning) at a temperature at which the composition does not reach to be sintered (i.e., semi-sintered). In addition the semi-sintered body comprises those having been formed (shaped) and worked. For example, the semi-sintered body also includes a dental product (for example, a prosthesis having a tooth crown shape) which is produced by machining a zirconia semi-sintered disk with CAD/CAM (Computer-Aided Design/Computer-Aided Manufacturing) system.

The composition of the present invention comprises powder, fluid (where powder is added to solvent), a shape-formed body in which powder is formed to have a predetermined configuration. That is, the composition may be in powder form, paste form or wet composition (that is, which may be in a solvent or contain a solvent). In addition, the composition may be those containing an additive, such as a binder and a pigment. Herein, in calculation of the above content ratio, weight of the additive, such as solvent and binder, is not taken into account. In a case of a shape-formed body, the composition of the present invention may be those formed by any forming methods, for example, those formed by press forming, injection molding, stereolithography (laser beam lithography), and those formed by multi-step forming. For example, the composition of the present invention may be subjected to press forming and then further to CIP (Cold Isostatic Pressing) processing.

The composition and semi-sintered body contain partially stabilized zirconia and shielding material. Type and content ratio of the stabilizer in the composition and semi-sintered body may be similar to above. Type of the shielding material may be similar to above.

It is preferable that in the composition and the semi-sintered body, fluctuation in content ratio of the stabilizer (for example, yttria) is smaller. For example, it is preferable that the fluctuation in content ratio of the stabilizer is 1 mol % or less, more preferably 0.5 mol %, and it is further preferable that no significant difference may be substantially detected.

The composition subjected to shape-forming (formed composition) and the semi-sintered body have a construction similar to a zirconia sintered body to be produced. For example, in a case where the zirconia sintered body shown in FIGS. 1 to 3 is produced, the formed composition and the semi-sintered body have a construction and a configuration shown in FIGS. 1 to 3. In the present disclosure, a name corresponding to each region in the zirconia sintered body is assigned to each region in the formed composition and the semi-sintered body. For example, the first region in the formed composition and the semi-sintered body is the region corresponding to the first region in the zirconia sintered body.

Hereinafter, a composition and a semi-sintered body will be explained with an example of formed composition and semi-sintered body for producing zirconia sintered body according to the second exemplarly embodiment shown in FIG. 3.

The formed composition and semi-sintered body comprises first region 101 and second region 102 containing shielding material at a content ratio from the first region 101. It is preferable that the first region 101 and the second region 102 have layer shape. It is preferable that the first region 101 and the second region 102 are laminated. The formed composition and semi-sintered body may have plate shape which has a first surface and a second surface on an opposite side to the first surface. In such case, the first region may be arranged on a first surface side. The second region may be arranged on a second surface side.

It is preferable that a content ratio of the shielding material has a stepwise reducing tendency from the second region 102 toward the first region 101. It is preferable that the content ratio of the shielding material in the second region 102 is higher than a content ratio of the shielding material in the first region 101.

In addition to the first region 101 and the second region 102, the formed composition and the semi-sintered body may further comprise a third region 103 and a fourth region 104 between the first region 101 and the second region 102. It is preferable that content ratios of the shielding material in the third region 103 and the fourth region 104 are higher than the content ratio of the shielding material in the first region 101 and lower than the content ratio of the shielding material in the second region 102. It is preferable that the content ratio of the shielding material in the second region 102 is higher than the content ratio of shielding material in the fourth region 104. It is preferable that the content ratio of the shielding material in the fourth region 104 is higher than the content ratio of shielding material in the third region 103. It is preferable that the content ratio of the shielding material in the third region 103 is higher than the content ratio of the shielding material in the first region 101.

It is preferable that a thickness of each region in the formed composition and the semi-sintered body corresponds to a thickness of each region in the zirconia sintered body to be produced.

The composition of the present disclosure is converted to a semi-sintered body of the present disclosure by firing the composition of the present invention, for example, under (i.e., in) normal pressure at 800° C. to 1200° C.

The composition and the semi-sintered body of the present disclosure is converted to a zirconia sintered body of the present disclosure by firing, for example, under normal pressure, at 1400° C. to 1650° C.

According to the composition and the semi-sintered body of the present disclosure, a zirconia sintered body of the present disclosure may be produced.

Next, a dental product of the present disclosure will be explained.

The dental product comprises the zirconia sintered body or the semi-sintered body of the above mentioned exemplary embodiments.

The dental product comprises, for example, a prosthesis, such as a ceramic frame, a full contour crown etc. It is preferable that the dental prosthesis has a tooth crown configuration. The dental prosthesis may further comprise a porcelain material (for example, glass material) laminated on the zirconia sintered body or the semi-sintered body.

It is preferable that the dental prosthesis comprises a second region on a cervical side. It is preferable that the dental prosthesis comprises a first region on an incisal side. It is preferable that the dental prosthesis has an increasing transparency from the cervical side toward the incisal side. It is preferable that the second region covers a side surface of an abutment tooth. In a case of the zirconia sintered body of the second exemplary embodiment, the dental prosthesis may be formed in a manner where the second region and a fourth region having a low transparency cover a side surface of an abutment tooth.

In addition, the dental product may also comprise, for example, an orthodontic product (for example, an orthodontic bracket), and a dental implant product (for example, a dental implant abutment).

Next, producing methods for zirconia sintered body, zirconia semi-sintered body and zirconia composition, as well as a producing method for a dental product will be explained. Herein, the zirconia sintered body, semi-sintered body and composition will be explained as an exemplary embodiment comprising first to second regions as shown in figures.

First, zirconia and stabilizer are wet-mixed in water to form a slurry. Next, the slurry is dried to form granules. Then, the granules are calcined to produce primary powder.

Next, the primary powder is divided into the number of the layers. Each primary powder is admixed with a predetermined amount of each layer of a shielding material according to its position. Then, each powder is mixed with zirconia and pulverized to have a desired particle diameter in water in order to form a zirconia slurry. Next, the slurry is dried to form a granule to produce secondary powder.

Next, a plurality of powders having different content ratios of the shielding material are sequentially laminated. It is preferable that the almination is carried out in a manner where adding ratio of the shielding material is stepwisely increased or decreased along with the order to be laminated. First, a mold is filled up with a powder for a first layer, and then upper surface of the first layer powder is smoothed into a flat surface. As a method for flattening, for example, methods may be adopted, where the mold is vibrated or the upper surface of the first layer powder is flattened by smoothing. With proviso that it is preferable that any pressing process is not carried out until all layers are laminated.

Next, a second layer powder is applied onto the first layer powder. Next, the mold is subjected to vibration. The vibration is carried out in a manner where vibration is conducted to the powder in the mold. Methods for providing vibration may be adopted, where, for example, the mold is provided with mechanical vibration, the mold is manually shaken, the mold is hit with a hammer and the like, and a desired pertinent method. Thereby, it is thought that at a boundary between the first layer powder and the second layer powder, the first layer powder and the second layer powder are partially mixed. That is, number and strength of the vibration, and frequency and amplitude in a case of mechanical vibration, may be appropriately designed according to particle diameter of powder, distribution in particle diameter, configuration (shape) of particles etc. so that the powders in the upper and lower layers are mixed at the boundary of the layers. Next, similarly to the first layer powder, upper surface of the second layer powder is smoothly flattened. This operation is repeated until all layers are laminated.

For example, in a case where the above mentioned composition and the semi-sintered body having total 4 layers are produced, the mold is charged with the first layer powder up to a predetermined thickness (for example, 25% to 45% at the entire thickness). Herein, upper surface of the first layer powder is smoothed into a flat state, but pressing process is not carried out. Next, the second layer powder is charged onto the first layer powder up to a predetermined thickness (for example, 5% to 25% of the entire thickness). Next, the mold is subjected to vibration. By means of the vibration, at a boundary between an upper surface of the first layer powder and a lower surface of the second layer powder, it is prospected that a first boundary layer where the first layer powder and the second layer powder are mixed would be formed. Next, an upper surface of the second layer powder is smoothed into a flat state. Pressing process is not carried out to the second layer powder before charging with a third layer powder. Next, the third layer powder is charged onto the second layer powder up to a predetermined thickness (for example, 5% to 25% of the entire thickness). Next, the mold is subjected to vibration. By means of the vibration, at a boundary between an upper surface of the second layer powder and a lower surface of the third layer powder, it is prospected that a second boundary layer where the second layer powder and the third layer powder are mixed would be formed. Next, an upper surface of the third layer powder is smoothed into flat state. Pressing process is not carried out to the third layer powder before charging a fourth layer powder. Then, the fourth layer powder is charged onto the third layer powder up to a predetermined thickness (for example, 25% to 45% of the entire thickness). Next, the mold is subjected to vibration. By means of the vibration, at boundary between an upper surface of the third layer powder and a lower surface of the fourth layer powder, it is prospected that a third boundary layer where the third layer powder and the fourth layer powder are mixed would be formed.

When all layers are laminated, press forming is carried out to produce a molding product as a composition of the present invention. CIP processing may be further carried out to the molding product.

It is thought that by means that no pressing process is carried out before charging of a next layer powder and vibration is given at every round of charging for each layer, a boundary layer where powder of upper and lower layers is mixed would be formed between adjacent layers. Thereby, a sintered body may be provided with an enhanced adhesiveness between adjacent layers. Contraction amount or contraction speed upon heating process may be unified for each layer, it may be perevented that detachment between layers occurs during heating process and that sintered body is provided with undesired deformation relative to a target configuration (or shape). In addition, difference in transparency and color between adjacent layers may be reduced. Thereby, in a sintered body, transparency and color may be naturally varied in a laminated direction.

In addition, the pressing process is unnecessary for each of layers. Thereby, labor and time may be greatly reduced to lower production cost.

In a case where the semi-sintered body is not produced, by firing the composition at, for example, 1400° C. to 1600° C., preferably 1450° C. to 1550° C., zirconia powder is sintered to produce the zirconia sintered body of the present invention. It may be formed (shaped) into a desired configuration at the stage of a molding product.

In a case where the semi-sintered body is produced, by firing the composition at, for example, 800° C. to 1200° C., the semi-sintered body is produced. Next, by firing the semi-sintered body at, for example, 1400° C. to 1650° C., preferably 1450° C. to 1600° C., the zirconia powder is sintered to produce the zirconia sintered body of the present invention. The shape forming may be carried out by cut-machining and the like at the stage of the semi-sintered body, and also may be carried out after sintering. The shape forming may be carried out by a CAD/CAM system.

The producing method of the dental product is similar to the producing method of the sintered body, except for the shape forming of the semi-sintered body or sintered body to a configuration of a dental product, such as a tooth crown configuration.

Herein, although the above mentioned exemplarly embodiment exemplifies the composition, the semi-sintered body and the sintered body based on a laminated product having 4 layers, they are not limited to 4 layers. In addition, figures are provided for easiness in explanation of positional relationship between each point and direction, thus the configuration (shape) and size are not limited to the modes shown in figures.

EXAMPLES

Examples 1 to 25

Zirconia sintered bodies were produced and color degree for each sample was measured. In Examples 1 to 25, zirconia sintered body samples corresponding to each region in a zirconia sintered body having a construction of 4 layers like as the second exemplarly embodiment shown in FIG. 2 were produced, and the color degree of each sample was measured. Tables 1 to 25 show data and measurement results for the sample compositions. "White background" means that the color degree is measured with a white contrast ratio measuring sheet as background (backboard) used in measurement for paint. "Black background" means that the color degree is measured with a white [sic, black] contrast ratio measuring sheet as background (backboard) used in measurement for paint. "ΔL" means difference between L* value measured on the white background and L* value measured on the black background. "ΔL interlayer difference" means difference in ΔL between adjacent layers. Difference between ΔL of n layer and ΔL of (n+1) layer is indicated in a field for the (n+1) layer. "ΔL entire difference" means difference between ΔL of the first region and ΔL of the second region. In Tables 1 to 25, the same sample number is assigned to the same sample.

First, a partially stabilized zirconia was prepared, which contains 5.5 mol % or 6 mol % of yttria as a stabilizer. The partially stabilized zirconia was added with a shielding materials shown in tables, and then mixed. Addition amount of shielding material shown in tables means weight of the shielding material relative to weight of the partially stabilized zirconia. For example, 0.3% for $TiO_2$ means that 0.3 g of $TiO_2$ is added to 100 g of the partially stabilized zirconia. In the shielding materials shown in tables, Z300 means zirconium/vanadium complex oxide ((Zr, V) $O_2$); NITTO GANRYO KOGYO CO., LTD. "Z-300 yellow"). Next, 1.3 g of the mixture was charged into a circular column mold having about 18 mm of diameter, being subjected to forming with 30 kN of pressure, and then being subjected to CIP processing at 170 MPa for 1 minute, so as to produce a formed (shaped) composition. Next, the formed composition was fired at firing temperatures shown in tables for 2 hours so as to produce a circular plate (disk) of zirconia sintered body. Next, the surface of the sintered body was polished to have a mirror (surface) finish (#2000 or more), so as to produce a sample having 1.2 mm of thickness. In addition, color degree for each sample was measured with a color degree measurement machine (KONIKA MINOLTA INC, SPECTROPHOTOMETER CM-3610A) and an analysis soft (Spectra Magic NX).

In the partially stabilized zirconia used for a sample for each region, the same product where yttria had been uniformly mixed was used, it is thought that there was no detectable significant fluctuation in the content ratio of yttria between samples for each region.

In Examples 1 to 25, addition amount of the shielding material was increased from the sample corresponding to the first region toward the sample corresponding to the second region. As a result, it was confirmed that ΔL is sequentially reduced from the sample corresponding to the first region to the sample corresponding to the second region. Thereby, it was confirmed that, when a zirconia sintered body is produced by laminating composition of each layer, a zirconia sintered body having stepwisely varying transparency can be produced. That is, it has been confirmed that a dental prosthesis having more natural variation of transparency may be produced. Since the content ratio of the stabilizer in each layer is equal, the contraction ratio in each layer upon sintering may be unified. Thereby, failure-generation due to sintering may be suppressed.

It was confirmed that, when a dental prosthesis having 7.5 or less of ΔL of the second region was produced, even in a case where color of an abutment tooth was dark (black), the abutment tooth could not be seen-through in the second region. Therefore, it was confirmed that, in a case where the abutment tooth is desired to be hardly seen-through, a transparency at which the abutment tooth is hardly seen-through is obtained by designing ΔL of the region covering the abutment tooth at 7.5 or less.

Difference in ΔL between layers was within a range of 0.01 to 2. In addition, a range of the entire ΔL was 0.9 to 4. Under such prerequisites, transparency variation similar to a natural tooth could be confirmed from the first region toward the second region.

It was confirmed that although NiO and Z300 were compounds which were also used as a pigment, they could be utilized as a shielding material for reducing transparency.

TABLE 1

| Example 1 | | | first region sample 1 | third region sample 2 | fourth region sample 3 | second region sample 4 |
|---|---|---|---|---|---|---|
| $Y_2O_3$ (mol %) | | | 5.5 | 5.5 | 5.5 | 5.5 |
| Shielding material (%) | | | $TiO_2$: 0 | $TiO_2$: 0.09 | $TiO_2$: 0.21 | $TiO_2$: 0.3 |
| | | | NiO: 0.0098 | NiO: 0.0169 | NiO: 0.0221 | NiO: 0.026 |
| | | | Z300: 0.0156 | Z300: 0.0270 | Z300: 0.0354 | Z300: 0.0416 |
| Firing temperature (° C.) | | | 1550 | 1550 | 1550 | 1550 |
| Color degree | white background | L* | 81.30 | 80.68 | 79.01 | 78.22 |
| | | a* | 0.13 | 1.76 | 2.95 | 4.16 |
| | | b* | 18.97 | 23.57 | 24.98 | 25.85 |
| | black background | L* | 72.70 | 72.30 | 72.13 | 72.07 |
| | | a* | −1.04 | −0.29 | 0.39 | 1.19 |
| | | b* | 10.51 | 14.10 | 16.20 | 17.42 |
| ΔL | | | 8.60 | 8.38 | 6.88 | 6.15 |
| ΔL interlayer difference | | | — | 0.22 | 1.50 | 0.73 |
| ΔL entire difference | | | | 2.45 | | |

TABLE 2

| Example 2 | | first region sample 1 | third region sample 5 | fourth region sample 6 | second region sample 7 |
|---|---|---|---|---|---|
| $Y_2O_3$ (mol %) | | 5.5 | 5.5 | 5.5 | 5.5 |
| Shielding material (%) | | TiO2: 0 | TiO2: 0.075 | TiO2: 0.175 | TiO2: 0.25 |
| | | NiO: 0.0098 | NiO: 0.0169 | NiO: 0.0221 | NiO: 0.026 |
| | | Z300: 0.0156 | Z300: 0.0270 | Z300: 0.0354 | Z300: 0.0416 |
| Firing temperature (° C.) | | 1550 | 1550 | 1550 | 1550 |
| Color degree | white background L* | 81.30 | 78.97 | 77.95 | 77.45 |
| | a* | 0.13 | 1.98 | 3.23 | 4.02 |
| | b* | 18.97 | 23.42 | 25.27 | 25.75 |
| | black background L* | 72.70 | 71.60 | 71.20 | 71.20 |
| | a* | −1.04 | −0.11 | 0.61 | 1.07 |
| | b* | 10.51 | 14.70 | 16.61 | 17.34 |
| ΔL | | 8.60 | 7.37 | 6.75 | 6.25 |
| ΔL interlayer difference | | — | 1.23 | 0.62 | 0.50 |
| ΔL entire difference | | | 2.35 | | |

TABLE 3

| Example 3 | | first region sample 1 | third region sample 8 | fourth region sample 9 | second region sample 10 |
|---|---|---|---|---|---|
| $Y_2O_3$ (mol %) | | 5.5 | 5.5 | 5.5 | 5.5 |
| Shielding material (%) | | TiO2: 0 | TiO2: 0.06 | TiO2: 0.14 | TiO2: 0.2 |
| | | NiO: 0.0098 | NiO: 0.0169 | NiO: 0.0221 | NiO: 0.026 |
| | | Z300: 0.0156 | Z300: 0.0270 | Z300: 0.0354 | Z300: 0.0416 |
| Firing temperature (° C.) | | 1550 | 1550 | 1550 | 1550 |
| Color degree | white background L* | 81.30 | 78.97 | 77.85 | 77.17 |
| | a* | 0.13 | 1.91 | 3.25 | 4.08 |
| | b* | 18.97 | 23.30 | 25.14 | 25.81 |
| | black background L* | 72.70 | 71.43 | 70.99 | 70.82 |
| | a* | −1.04 | −0.20 | 0.67 | 1.09 |
| | b* | 10.51 | 14.46 | 16.65 | 17.30 |
| ΔL | | 8.60 | 7.54 | 6.86 | 6.35 |
| ΔL interlayer difference | | — | 1.06 | 0.68 | 0.51 |
| ΔL entire difference | | | 2.25 | | |

TABLE 4

| Example 4 | | | first region sample 11 | third region sample 12 | fourth region sample 13 | second region sample 14 |
|---|---|---|---|---|---|---|
| Y$_2$O$_3$ (mol %) | | | 5.5 | 5.5 | 5.5 | 5.5 |
| Shielding material (%) | | | TiO2: 0 | TiO2: 0.09 | TiO2: 0.21 | TiO2: 0.3 |
| | | | NiO: 0.0096 | NiO: 0.0152 | NiO: 0.0199 | NiO: 0.0234 |
| | | | Z300: 0.0157 | Z300: 0.0270 | Z300: 0.0354 | Z300: 0.0416 |
| Firing temperature (° C.) | | | 1550 | 1550 | 1550 | 1550 |
| Color degree | white background | L* | 80.96 | 80.39 | 79.92 | 79.31 |
| | | a* | 0.38 | 1.58 | 2.65 | 3.55 |
| | | b* | 19.22 | 22.81 | 24.58 | 25.70 |
| | black background | L* | 72.16 | 72.43 | 72.61 | 72.45 |
| | | a* | −1.00 | −0.38 | 0.17 | 0.67 |
| | | b* | 10.27 | 13.61 | 15.35 | 16.51 |
| ΔL | | | 8.80 | 7.96 | 7.31 | 6.86 |
| ΔL interlayer difference | | | — | 0.84 | 0.65 | 0.45 |
| ΔL entire difference | | | | 1.94 | | |

TABLE 5

| Example 5 | | | first region sample 15 | third region sample 16 | fourth region sample 17 | second region sample 18 |
|---|---|---|---|---|---|---|
| Y$_2$O$_3$ (mol %) | | | 5.5 | 5.5 | 5.5 | 5.5 |
| Shielding material (%) | | | TiO2: 0 | TiO2: 0.12 | TiO2: 0.28 | TiO2: 0.4 |
| | | | NiO: 0.0049 | NiO: 0.0085 | NiO: 0.0111 | NiO: 0.013 |
| | | | Z300: 0.0078 | Z300: 0.0135 | Z300: 0.0177 | Z300: 0.0208 |
| Firing temperature (° C.) | | | 1550 | 1550 | 1550 | 1550 |
| Color degree | white background | L* | 83.97 | 83.87 | 83.32 | 82.98 |
| | | a* | −0.27 | −0.83 | 0.25 | 1.12 |
| | | b* | 17.51 | 12.86 | 19.60 | 21.56 |
| | black background | L* | 73.87 | 74.35 | 75.09 | 75.23 |
| | | a* | −1.40 | −1.22 | −1.00 | −0.64 |
| | | b* | 5.14 | 9.13 | 10.94 | 12.50 |
| ΔL | | | 10.10 | 9.52 | 8.23 | 7.75 |
| ΔL interlayer difference | | | — | 0.58 | 1.29 | 0.48 |
| ΔL entire difference | | | | 2.35 | | |

TABLE 6

| Example 6 | | | first region sample 15 | third region sample 19 | fourth region sample 20 | second region sample 21 |
|---|---|---|---|---|---|---|
| Y$_2$O$_3$ (mol %) | | | 5.5 | 5.5 | 5.5 | 5.5 |
| Shielding material (%) | | | TiO2: 0 | TiO2: 0.105 | TiO2: 0.245 | TiO2: 0.35 |
| | | | NiO: 0.0049 | NiO: 0.0085 | NiO: 0.0111 | NiO: 0.013 |
| | | | Z300: 0.0078 | Z300: 0.0135 | Z300: 0.0177 | Z300: 0.0208 |
| Firing temperature (° C.) | | | 1550 | 1550 | 1550 | 1550 |
| Color degree | white background | L* | 83.87 | 82.79 | 82.34 | 82.19 |
| | | a* | −0.83 | −0.07 | 0.56 | 1.08 |
| | | b* | 12.86 | 17.61 | 20.29 | 21.73 |
| | black background | L* | 73.87 | 73.91 | 74.23 | 74.30 |
| | | a* | −1.40 | −1.17 | −0.84 | −0.63 |
| | | b* | 5.14 | 9.07 | 11.62 | 12.87 |
| ΔL | | | 10.00 | 8.88 | 8.11 | 7.89 |
| ΔL interlayer difference | | | — | 1.12 | 0.77 | 0.22 |
| ΔL entire difference | | | | 2.11 | | |

TABLE 7

| Example 7 | | first region sample 15 | third region sample 22 | fourth region sample 23 | second region sample 24 |
|---|---|---|---|---|---|
| Y$_2$O$_3$ (mol %) | | 5.5 | 5.5 | 5.5 | 5.5 |
| Shielding material (%) | | TiO2: 0 | TiO2: 0.09 | TiO2: 0.21 | TiO2: 0.3 |
| | | NiO: 0.0049 | NiO: 0.0085 | NiO: 0.0111 | NiO: 0.013 |
| | | Z300: 0.0078 | Z300: 0.0135 | Z300: 0.0177 | Z300: 0.0208 |

TABLE 7-continued

| Example 7 | | | first region sample 15 | third region sample 22 | fourth region sample 23 | second region sample 24 |
|---|---|---|---|---|---|---|
| Firing temperature (° C.) | | | 1550 | 1550 | 1550 | 1550 |
| Color degree | white background | L* | 83.87 | 82.47 | 82.23 | 81.89 |
| | | a* | −0.83 | −0.07 | 0.62 | 0.95 |
| | | b* | 12.86 | 17.90 | 20.27 | 21.22 |
| | black background | L* | 73.87 | 73.63 | 74.10 | 74.11 |
| | | a* | −1.40 | −1.18 | −0.79 | −0.68 |
| | | b* | 5.14 | 9.31 | 11.57 | 12.56 |
| ΔL | | | 10.00 | 8.84 | 8.13 | 7.78 |
| ΔL interlayer difference | | | — | 1.16 | 0.71 | 0.35 |
| ΔL entire difference | | | | 2.22 | | |

TABLE 8

| Example 8 | | | first region sample 25 | third region sample 26 | fourth region sample 27 | second region sample 28 |
|---|---|---|---|---|---|---|
| $Y_2O_3$ (mol %) | | | 5.5 | 5.5 | 5.5 | 5.5 |
| Shielding material (%) | | | TiO2: 0 | TiO2: 0.12 | TiO2: 0.28 | TiO2: 0.4 |
| | | | NiO: 0.0048 | NiO: 0.0076 | NiO: 0.0099 | NiO: 0.0117 |
| | | | Z300: 0.0079 | Z300: 0.0122 | Z300: 0.0159 | Z300: 0.0187 |
| Firing temperature (° C.) | | | 1550 | 1550 | 1550 | 1550 |
| Color degree | white background | L* | 83.37 | 83.96 | 83.96 | 83.44 |
| | | a* | −0.86 | −0.46 | 0.20 | 0.66 |
| | | b* | 12.71 | 16.49 | 19.13 | 20.38 |
| | black background | L* | 73.65 | 74.76 | 75.31 | 75.69 |
| | | a* | −1.42 | −1.27 | −1.04 | −0.78 |
| | | b* | 5.15 | 8.16 | 10.16 | 11.71 |
| ΔL | | | 9.72 | 9.20 | 8.65 | 7.75 |
| ΔL interlayer difference | | | — | 0.52 | 0.55 | 0.90 |
| ΔL entire difference | | | | 1.97 | | |

TABLE 9

| Example 9 | | | first region sample 29 | third region sample 30 | fourth region sample 31 | second region sample 32 |
|---|---|---|---|---|---|---|
| $Y_2O_3$ (mol %) | | | 5.5 | 5.5 | 5.5 | 5.5 |
| Shielding material (%) | | | TiO2: 0 | TiO2: 0.105 | TiO2: 0.245 | TiO2: 0.350 |
| | | | NiO: 0.0073 | NiO: 0.0127 | NiO: 0.0166 | NiO: 0.0195 |
| | | | Z300: 0.0117 | Z300: 0.0203 | Z300: 0.0265 | Z300: 0.0312 |
| Firing temperature (° C.) | | | 1550 | 1550 | 1550 | 1550 |
| Color degree | white background | L* | 82.23 | 79.90 | 80.33 | 79.83 |
| | | a* | −0.23 | 1.01 | 1.90 | 2.70 |
| | | b* | 15.77 | 21.01 | 23.48 | 23.38 |
| | black background | L* | 72.59 | 71.28 | 72.74 | 72.74 |
| | | a* | −1.21 | −0.72 | −0.17 | 0.30 |
| | | b* | 7.89 | 12.48 | 14.26 | 14.90 |
| ΔL | | | 9.64 | 8.62 | 7.59 | 7.09 |
| ΔL interlayer difference | | | — | 1.02 | 1.03 | 0.50 |
| ΔL entire difference | | | | 2.55 | | |

TABLE 10

| Example 10 | | | first region sample 33 | third region sample 34 | fourth region sample 35 | second region sample 36 |
|---|---|---|---|---|---|---|
| $Y_2O_3$ (mol %) | | | 5.5 | 5.5 | 5.5 | 5.5 |
| Shielding material (%) | | | TiO2: 0 | TiO2: 0.090 | TiO2: 0.210 | TiO2: 0.300 |
| | | | NiO: 0.0126 | NiO: 0.0218 | NiO: 0.0285 | NiO: 0.0335 |
| | | | Z300: 0.0207 | Z300: 0.0359 | Z300: 0.0469 | Z300: 0.0552 |
| Firing temperature (° C.) | | | 1550 | 1550 | 1550 | 1550 |
| Color degree | white background | L* | 79.62 | 76.49 | 75.40 | 74.51 |
| | | a* | 1.19 | 3.30 | 4.50 | 5.34 |
| | | b* | 21.94 | 24.89 | 25.39 | 25.96 |

TABLE 10-continued

| Example 10 | | | first region sample 33 | third region sample 34 | fourth region sample 35 | second region sample 36 |
|---|---|---|---|---|---|---|
| black | | L* | 71.23 | 70.08 | 69.80 | 69.92 |
| background | | a* | −0.62 | 0.80 | 1.71 | 2.06 |
| | | b* | 12.39 | 16.57 | 17.81 | 17.97 |
| | ΔL | | 8.39 | 6.41 | 5.60 | 4.59 |
| ΔL interlayer difference | | | — | 1.98 | 0.81 | 1.01 |
| ΔL entire difference | | | | 3.80 | | |

TABLE 11

| Example 11 | | | first region sample 37 | third region sample 38 | fourth region sample 39 | second region sample 40 |
|---|---|---|---|---|---|---|
| Y$_2$O$_3$ (mol %) | | | 5.5 | 5.5 | 5.5 | 5.5 |
| Shielding material (%) | | | TiO2: 0 NiO: 0.0113 Z300: 0.0188 | TiO2: 0.090 NiO: 0.0196 Z300: 0.0326 | TiO2: 0.210 NiO: 0.0257 Z300: 0.0426 | TiO2: 0.300 NiO: 0.0302 Z300: 0.0501 |
| Firing temperature (° C.) | | | 1550 | 1550 | 1550 | 1550 |
| Color degree | white background | L* | 80.01 | 77.59 | 76.53 | 75.86 |
| | | a* | 0.84 | 2.79 | 3.98 | 4.67 |
| | | b* | 20.83 | 24.28 | 25.10 | 25.37 |
| | black background | L* | 71.67 | 70.69 | 70.48 | 70.46 |
| | | a* | −0.80 | 0.43 | 1.16 | 1.69 |
| | | b* | 11.41 | 15.72 | 16.88 | 17.93 |
| | ΔL | | 8.34 | 6.90 | 6.05 | 5.40 |
| ΔL interlayer difference | | | — | 1.44 | 0.85 | 0.65 |
| ΔL entire difference | | | | 2.94 | | |

TABLE 12

| Example 12 | | | first region sample 41 | third region sample 42 | fourth region sample 43 | second region sample 44 |
|---|---|---|---|---|---|---|
| Y$_2$O$_3$ (mol %) | | | 5.5 | 5.5 | 5.5 | 5.5 |
| Shielding material (%) | | | TiO2: 0 NiO: 0.0066 Z300: 0.0105 | TiO2: 0.105 NiO: 0.0114 Z300: 0.0183 | TiO2: 0.245 NiO: 0.0150 Z300: 0.0239 | TiO2: 0.350 NiO: 0.0176 Z300: 0.0281 |
| Firing temperature (° C.) | | | 1550 | 1550 | 1550 | 1550 |
| Color degree | white background | L* | 83.10 | 81.40 | 81.61 | 80.55 |
| | | a* | −0.65 | 0.66 | 1.42 | 2.18 |
| | | b* | 15.00 | 20.40 | 22.51 | 23.43 |
| | black background | L* | 73.74 | 73.35 | 73.88 | 74.03 |
| | | a* | −1.38 | −0.84 | −0.48 | −0.04 |
| | | b* | 7.18 | 11.74 | 13.53 | 14.90 |
| | ΔL | | 9.36 | 8.05 | 7.73 | 6.52 |
| ΔL interlayer difference | | | — | 1.31 | 0.32 | 1.21 |
| ΔL entire difference | | | | 2.84 | | |

TABLE 13

| Example 13 | | | first region sample 45 | third region sample 46 | fourth region sample 47 | second region sample 48 |
|---|---|---|---|---|---|---|
| Y$_2$O$_3$ (mol %) | | | 5.5 | 5.5 | 5.5 | 5.5 |
| Shielding material (%) | | | TiO2: 0 NiO: 0.00008 Z300: 0.0015 | TiO2: 0.120 NiO: 0.00013 Z300: 0.0026 | TiO2: 0.280 NiO: 0.00017 Z300: 0.0034 | TiO2: 0.400 NiO: 0.0002 Z300: 0.004 |
| Firing temperature (° C.) | | | 1550 | 1550 | 1550 | 1550 |
| Color degree | white background | L* | 84.87 | 84.71 | 84.84 | 85.27 |
| | | a* | −0.62 | −0.47 | −0.33 | −0.34 |
| | | b* | 4.55 | 6.97 | 8.76 | 9.13 |
| | black background | L* | 74.27 | 75.17 | 75.88 | 76.76 |
| | | a* | −0.97 | −0.82 | −0.80 | −0.83 |
| | | b* | −0.49 | 1.74 | 2.77 | 3.09 |
| | ΔL | | 10.60 | 9.54 | 8.96 | 8.51 |

TABLE 13-continued

| Example 13 | first region sample 45 | third region sample 46 | fourth region sample 47 | second region sample 48 |
|---|---|---|---|---|
| ΔL interlayer difference | — | 1.06 | 0.58 | 0.45 |
| ΔL entire difference | | 2.09 | | |

TABLE 14

| Example 14 | | | first region sample 49 | third region sample 50 | fourth region sample 51 | second region sample 52 |
|---|---|---|---|---|---|---|
| $Y_2O_3$ (mol %) | | | 5.5 | 5.5 | 5.5 | 5.5 |
| Shielding material (%) | | | TiO2: 0 | TiO2: 0.120 | TiO2: 0.280 | TiO2: 0.400 |
| | | | NiO: 0.00008 | NiO: 0.00013 | NiO: 0.00017 | NiO: 0.0002 |
| | | | Z300: 0.0014 | Z300: 0.0023 | Z300: 0.0031 | Z300: 0.0036 |
| Firing temperature (° C.) | | | 1550 | 1550 | 1550 | 1550 |
| Color degree | white background | L* | 84.81 | 85.21 | 85.21 | 85.56 |
| | | a* | −0.72 | −0.45 | −0.45 | −0.27 |
| | | b* | 3.82 | 6.76 | 6.76 | 9.05 |
| | black background | L* | 74.38 | 75.30 | 75.30 | 76.78 |
| | | a* | −1.01 | −0.86 | −0.86 | −0.78 |
| | | b* | −0.87 | 1.22 | 1.22 | 3.00 |
| ΔL | | | 10.43 | 9.91 | 9.91 | 8.78 |
| ΔL interlayer difference | | | — | 0.52 | 0.84 | 0.29 |
| ΔL entire difference | | | | 1.65 | | |

TABLE 15

| Example 15 | | | first region sample 53 | third region sample 54 | fourth region sample 55 | second region sample 56 |
|---|---|---|---|---|---|---|
| $Y_2O_3$ (mol %) | | | 6 | 6 | 6 | 6 |
| Shielding material (%) | | | NiO: 0.0047 | NiO: 0.0081 | NiO: 0.0106 | NiO: 0.0125 |
| | | | Z300: 0.0075 | Z300: 0.0130 | Z300: 0.0170 | Z300: 0.0200 |
| Firing temperature (° C.) | | | 1550 | 1550 | 1550 | 1550 |
| Color degree | white background | L* | 84.25 | 82.43 | 83.02 | 81.62 |
| | | a* | −0.92 | −0.03 | −0.63 | 0.69 |
| | | b* | 11.09 | 18.72 | 15.73 | 19.11 |
| | black background | L* | 73.84 | 72.63 | 73.41 | 72.38 |
| | | a* | −1.38 | −1.16 | −1.33 | −0.73 |
| | | b* | 4.07 | 10.42 | 7.47 | 9.68 |
| ΔL | | | 10.41 | 9.80 | 9.61 | 9.24 |
| ΔL interlayer difference | | | — | 0.61 | 0.19 | 0.37 |
| ΔL entire difference | | | | 1.17 | | |

TABLE 16

| Example 16 | | | first region sample 57 | third region sample 58 | fourth region sample 59 | second region sample 60 |
|---|---|---|---|---|---|---|
| $Y_2O_3$ (mol %) | | | 6 | 6 | 6 | 6 |
| Shielding material (%) | | | NiO: 0.0047 | NiO: 0.0122 | NiO: 0.0160 | NiO: 0.0188 |
| | | | Z300: 0.0113 | Z300: 0.0195 | Z300: 0.0255 | Z300: 0.0300 |
| Firing temperature (° C.) | | | 1550 | 1550 | 1550 | 1550 |
| Color degree | white background | L* | 82.20 | 83.51 | 81.02 | 80.02 |
| | | a* | 0.39 | −0.50 | 1.15 | 2.19 |
| | | b* | 19.38 | 14.30 | 23.26 | 24.08 |
| | black background | L* | 72.63 | 74.08 | 72.33 | 71.42 |
| | | a* | −1.01 | −1.23 | −0.66 | −0.25 |
| | | b* | 10.37 | 6.41 | 13.78 | 14.54 |
| ΔL | | | 9.57 | 9.43 | 8.69 | 8.60 |
| ΔL interlayer difference | | | — | 0.14 | 0.74 | 0.09 |
| ΔL entire difference | | | | 0.97 | | |

TABLE 17

| Example 17 | | | first region sample 61 | third region sample 62 | fourth region sample 63 | second region sample 64 |
|---|---|---|---|---|---|---|
| $Y_2O_3$ (mol %) | | | 6 | 6 | 6 | 6 |
| Shielding material (%) | | | NiO: 0.0094 | NiO: 0.0163 | NiO: 0.0213 | NiO: 0.0250 |
| | | | Z300: 0.0150 | Z300: 0.0260 | Z300: 0.0340 | Z300: 0.0400 |
| Firing temperature (° C.) | | | 1550 | 1550 | 1550 | 1550 |
| Color degree | white background | $L^*$ | 82.82 | 80.95 | 79.62 | 78.89 |
| | | $a^*$ | −0.07 | 0.97 | 2.19 | 3.71 |
| | | $b^*$ | 17.43 | 23.39 | 25.16 | 26.26 |
| | black background | $L^*$ | 73.03 | 72.27 | 71.45 | 70.78 |
| | | $a^*$ | −1.16 | −0.83 | −0.17 | 0.78 |
| | | $b^*$ | 8.43 | 13.83 | 15.48 | 16.60 |
| | | $\Delta L$ | 9.79 | 8.68 | 8.17 | 8.11 |
| $\Delta L$ interlayer difference | | | — | 1.11 | 0.51 | 0.06 |
| $\Delta L$ entire difference | | | 1.68 | | | |

TABLE 18

| Example 18 | | | first region sample 65 | third region sample 66 | fourth region sample 67 | second region sample 68 |
|---|---|---|---|---|---|---|
| $Y_2O_3$ (mol %) | | | 6 | 6 | 6 | 6 |
| Shielding material (%) | | | NiO: 0.0084 | NiO: 0.0146 | NiO: 0.0191 | NiO: 0.0225 |
| | | | Z300: 0.0135 | Z300: 0.0234 | Z300: 0.0306 | Z300: 0.0360 |
| Firing temperature (° C.) | | | 1550 | 1550 | 1550 | 1550 |
| Color degree | white background | $L^*$ | 82.18 | 80.04 | 78.86 | 77.33 |
| | | $a^*$ | −0.31 | 1.22 | 2.30 | 3.26 |
| | | $b^*$ | 17.24 | 22.45 | 24.44 | 25.55 |
| | black background | $L^*$ | 72.72 | 71.20 | 70.43 | 69.24 |
| | | $a^*$ | −1.28 | −0.67 | −0.08 | 0.44 |
| | | $b^*$ | 8.69 | 12.88 | 14.99 | 15.93 |
| | | $\Delta L$ | 9.46 | 8.84 | 8.43 | 8.09 |
| $\Delta L$ interlayer difference | | | — | 0.62 | 0.41 | 0.34 |
| $\Delta L$ entire difference | | | 1.37 | | | |

TABLE 19

| Example 19 | | | first region sample 69 | third region sample 70 | fourth region sample 71 | second region sample 72 |
|---|---|---|---|---|---|---|
| $Y_2O_3$ (mol %) | | | 6 | 6 | 6 | 6 |
| Shielding material (%) | | | NiO: 0.0028 | NiO: 0.0110 | NiO: 0.0144 | NiO: 0.0225 |
| | | | Z300: 0.0063 | Z300: 0.0176 | Z300: 0.0230 | Z300: 0.0360 |
| Firing temperature (° C.) | | | 1550 | 1550 | 1550 | 1550 |
| Color degree | white background | $L^*$ | 83.05 | 81.10 | 79.92 | 77.33 |
| | | $a^*$ | −0.47 | 0.37 | 1.15 | 3.26 |
| | | $b^*$ | 11.82 | 19.83 | 21.93 | 25.55 |
| | black background | $L^*$ | 73.00 | 71.77 | 71.09 | 69.24 |
| | | $a^*$ | −1.11 | −1.09 | −0.70 | 0.44 |
| | | $b^*$ | 4.82 | 10.58 | 12.67 | 15.93 |
| | | $\Delta L$ | 10.05 | 9.33 | 8.83 | 8.09 |
| $\Delta L$ interlayer difference | | | — | 0.72 | 0.50 | 0.74 |
| $\Delta L$ entire difference | | | 1.96 | | | |

TABLE 20

| Example 20 | | | first region sample 69 | third region sample 70 | fourth region sample 71 | second region sample 72 |
|---|---|---|---|---|---|---|
| $Y_2O_3$ (mol %) | | | 6 | 6 | 6 | 6 |
| Shielding material (%) | | | NiO: 0.0028 | NiO: 0.0111 | NiO: 0.0144 | NiO: 0.0225 |
| | | | Z300: 0.0063 | Z300: 0.0190 | Z300: 0.0230 | Z300: 0.0360 |
| Firing temperature (° C.) | | | 1550 | 1550 | 1550 | 1550 |
| Color degree | white background | $L^*$ | 83.05 | 80.50 | 79.92 | 77.33 |
| | | $a^*$ | −0.47 | 0.78 | 1.15 | 3.26 |
| | | $b^*$ | 11.82 | 20.66 | 21.93 | 25.55 |

TABLE 20-continued

| Example 20 | | first region sample 69 | third region sample 70 | fourth region sample 71 | second region sample 72 |
|---|---|---|---|---|---|
| black | L* | 73.00 | 71.64 | 71.09 | 69.24 |
| background | a* | −1.11 | −0.76 | −0.70 | 0.44 |
| | b* | 4.82 | 11.38 | 12.67 | 15.93 |
| ΔL | | 10.05 | 8.86 | 8.83 | 8.09 |
| ΔL interlayer difference | | — | 1.19 | 0.03 | 0.74 |
| ΔL entire difference | | | 1.96 | | |

TABLE 21

| Example 21 | | first region sample 73 | third region sample 74 | fourth region sample 75 | second region sample 76 |
|---|---|---|---|---|---|
| Y₂O₃ (mol %) | | 6 | 6 | 6 | 6 |
| Shielding material (%) | | NiO: 0.0063 Z300: 0.0101 | NiO: 0.0110 Z300: 0.0176 | NiO: 0.0144 Z300: 0.0230 | NiO: 0.0169 Z300: 0.0270 |
| Firing temperature (° C.) | | 1550 | 1550 | 1550 | 1550 |
| Color degree | white L* | 83.53 | 81.65 | 80.42 | 79.79 |
| | background a* | −0.80 | 0.36 | 1.32 | 1.79 |
| | b* | 14.16 | 20.38 | 22.87 | 24.04 |
| | black L* | 73.39 | 72.14 | 71.37 | 71.33 |
| | background a* | −1.42 | −1.05 | −0.60 | −0.33 |
| | b* | 6.37 | 11.14 | 13.36 | 14.38 |
| ΔL | | 10.14 | 9.51 | 9.05 | 8.46 |
| ΔL interlayer difference | | — | 0.63 | 0.46 | 0.59 |
| ΔL entire difference | | | 1.68 | | |

TABLE 22

| Example 22 | | first region sample 77 | third region sample 78 | fourth region sample 79 | second region sample 80 |
|---|---|---|---|---|---|
| Y₂O₃ (mol %) | | 6 | 6 | 6 | 6 |
| Shielding material (%) | | NiO: 0.0042 Z300: 0.0068 | NiO: 0.0074 Z300: 0.0117 | NiO: 0.0096 Z300: 0.0153 | NiO: 0.0113 Z300: 0.0180 |
| Firing temperature (° C.) | | 1550 | 1550 | 1550 | 1550 |
| Color degree | white L* | 84.34 | 82.53 | 81.67 | 80.98 |
| | background a* | −0.98 | −0.51 | 0.04 | 0.34 |
| | b* | 11.33 | 15.89 | 18.80 | 19.80 |
| | black L* | 74.35 | 72.87 | 72.02 | 71.96 |
| | background a* | −1.34 | −1.38 | −1.23 | −1.03 |
| | b* | 4.13 | 7.49 | 9.67 | 11.03 |
| ΔL | | 9.99 | 9.66 | 9.65 | 9.02 |
| ΔL interlayer difference | | — | 0.33 | 0.01 | 0.63 |
| ΔL entire difference | | | 0.97 | | |

TABLE 23

| Example 23 | | first region sample 81 | third region sample 82 | fourth region sample 83 | second region sample 84 |
|---|---|---|---|---|---|
| Y₂O₃ (mol %) | | 6 | 6 | 6 | 6 |
| Shielding material (%) | | TiO2: 0 NiO: 0.00004 Z300: 0.0008 | TiO2: 0 NiO: 0.00007 Z300: 0.0013 | TiO2: 0.21 NiO: 0.00009 Z300: 0.0017 | TiO2: 0.30 NiO: 0.0001 Z300: 0.002 |
| Firing temperature (° C.) | | 1550 | 1550 | 1550 | 1550 |
| Color degree | white L* | 85.47 | 84.77 | 84.67 | 84.55 |
| | background a* | −0.65 | −0.52 | −0.58 | −0.46 |
| | b* | 2.17 | 4.70 | 3.91 | 5.46 |
| | black L* | 74.06 | 73.98 | 74.34 | 74.47 |
| | background a* | −0.90 | −0.85 | −0.84 | −0.84 |
| | b* | −1.63 | −0.08 | −0.39 | 0.43 |

TABLE 23-continued

| Example 23 | first region sample 81 | third region sample 82 | fourth region sample 83 | second region sample 84 |
|---|---|---|---|---|
| ΔL | 11.41 | 10.79 | 10.33 | 10.08 |
| ΔL interlayer difference | — | 0.62 | 0.46 | 0.25 |
| ΔL entire difference | | 1.33 | | |

TABLE 24

| Example 24 | | | first region sample 85 | third region sample 86 | fourth region sample 87 | second region sample 88 |
|---|---|---|---|---|---|---|
| $Y_2O_3$ (mol %) | | | 6 | 6 | 6 | 6 |
| Shielding material (%) | | | TiO2: 0 | TiO2: 0 | TiO2: 0.21 | TiO2: 0.30 |
| | | | NiO: 0.0024 | NiO: 0.0041 | NiO: 0.0054 | NiO: 0.0063 |
| | | | Z300: 0.0038 | Z300: 0.0065 | Z300: 0.0085 | Z300: 0.010 |
| Firing temperature (° C.) | | | 1550 | 1550 | 1550 | 1550 |
| Color degree | white | L* | 84.80 | 83.55 | 82.79 | 82.33 |
| | background | a* | −1.11 | −1.15 | −0.95 | −0.70 |
| | | b* | 6.65 | 9.09 | 12.49 | 14.00 |
| | black | L* | 74.00 | 73.34 | 73.09 | 72.90 |
| | background | a* | −1.35 | −1.44 | −1.44 | −1.30 |
| | | b* | 1.50 | 2.91 | 5.48 | 6.20 |
| ΔL | | | 10.80 | 10.21 | 9.70 | 9.43 |
| ΔL interlayer difference | | | — | 0.59 | 0.51 | 0.27 |
| ΔL entire difference | | | | 1.37 | | |

TABLE 25

| Example 25 | | | first region sample 89 | third region sample 90 | fourth region sample 91 | second region sample 92 |
|---|---|---|---|---|---|---|
| $Y_2O_3$ (mol %) | | | 6 | 6 | 6 | 6 |
| Shielding material (%) | | | TiO2: 0 | TiO2: 0 | TiO2: 0.21 | TiO2: 0.30 |
| | | | NiO: 0.00008 | NiO: 0.00013 | NiO: 0.00017 | NiO: 0.0002 |
| | | | Z300: 0.0015 | Z300: 0.0026 | Z300: 0.0034 | Z300: 0.004 |
| Firing temperature (° C.) | | | 1550 | 1550 | 1550 | 1550 |
| Color degree | white | L* | 84.76 | 83.57 | 83.48 | 81.34 |
| | background | a* | −0.51 | −0.17 | −0.36 | 0.09 |
| | | b* | 4.60 | 8.23 | 6.76 | 9.81 |
| | black | L* | 73.79 | 73.26 | 73.42 | 72.00 |
| | background | a* | −0.86 | −0.73 | −0.82 | −0.69 |
| | | b* | −0.11 | 2.61 | 1.33 | 3.56 |
| ΔL | | | 10.97 | 10.31 | 10.06 | 9.34 |
| ΔL interlayer difference | | | — | 0.66 | 0.25 | 0.72 |
| ΔL entire difference | | | | 1.63 | | |

Examples 26 to 31

Samples in which type and content ratio in the shielding material had been varied were produced to measure color degree for each of samples. The producing method of each sample and the measuring method for color degree are the same with Examples 1 to 25. In Examples 26 to 31, zircon (ZrSiO₄), titanium oxide (TiO₂), alumina (Al₂O₃), and silicon dioxide (SiO₂) were used as the shielding material. In Examples 30 to 31, titanium oxide (TiO₂) and coloring agents shown in tables were used as the shielding material.

Tables 26 to 31 show producing condition and measurement results for samples. All types of the shielding material had ΔL reducing tendency along with increment in its content ratio. That is, there was reducing tendency in transparency. Thereby, it was confirmed that these compounds can be utilized as the shielding material. In addition, it was confirmed that transparency is able to be adjusted by adjusting content ratio of the shielding material.

TABLE 26

Example 26

| | | | sample 93 | sample 94 | sample 95 | sample 96 | sample 97 | sample 98 |
|---|---|---|---|---|---|---|---|---|
| | Y$_2$O$_3$ (mol %) | | 5.5 | 5.5 | 5.5 | 5.5 | 5.5 | 5.5 |
| | shielding material (%) | | ZrSiO$_4$: 0 | ZrSiO$_4$: 0.1 | ZrSiO$_4$: 0.3 | ZrSiO$_4$: 0.5 | ZrSiO$_4$: 0.7 | ZrSiO$_4$: 1 |
| | firing temperature (° C.) | | 1550 | 1550 | 1550 | 1550 | 1550 | 1550 |
| color | white | L* | 90.92 | 91.76 | 91.53 | 91.68 | 91.81 | 91.89 |
| degree | background | a* | −1.96 | −2.00 | −2.29 | −2.37 | −2.38 | −2.51 |
| | | b* | 4.51 | 5.57 | 6.40 | 7.11 | 7.94 | 8.45 |
| | black | L* | 75.03 | 79.57 | 82.13 | 83.63 | 84.50 | 85.18 |
| | background | a* | −1.71 | −1.92 | −2.16 | −2.42 | −2.37 | −2.28 |
| | | b* | 0.49 | 1.39 | 1.96 | 3.05 | 4.02 | 4.15 |
| | ΔL | | 15.89 | 12.19 | 9.40 | 8.05 | 7.31 | 6.71 |

TABLE 27

Example 27

| | | | sample 99 | sample 100 | sample 101 | sample 102 | sample 103 | sample 104 |
|---|---|---|---|---|---|---|---|---|
| | Y$_2$O$_3$ (mol %) | | 5.5 | 5.5 | 5.5 | 5.5 | 5.5 | 5.5 |
| | shielding material (%) | | TiO$_2$: 0 | TiO$_2$: 0.1 | TiO$_2$: 0.3 | TiO$_2$: 0.5 | TiO$_2$: 0.7 | TiO$_2$: 1 |
| | firing temperature (° C.) | | 1550 | 1550 | 1550 | 1550 | 1550 | 1550 |
| color | white | L* | 86.2 | 87.33 | 88.68 | 89.45 | 90.39 | 90.94 |
| degree | background | a* | −0.77 | −0.7 | −0.56 | −0.5 | −0.42 | −0.33 |
| | | b* | −0.85 | −0.65 | −0.01 | 0.36 | 0.78 | 1.33 |
| | black | L* | 74.66 | 76.49 | 78.45 | 79.83 | 81.17 | 82.91 |
| | background | a* | −0.85 | −0.74 | −0.6 | −0.52 | −0.46 | −0.39 |
| | | b* | −3.74 | −3.23 | −2.6 | −2.19 | −1.84 | −1.22 |
| | ΔL | | 11.54 | 10.84 | 10.23 | 9.62 | 9.22 | 8.03 |

TABLE 28

Example 28

| | | | sample 105 | sample 106 | sample 107 | sample 108 | sample 109 | sample 110 |
|---|---|---|---|---|---|---|---|---|
| | Y$_2$O$_3$ (mol %) | | 5.5 | 5.5 | 5.5 | 5.5 | 5.5 | 5.5 |
| | shielding material (%) | | Al$_2$O$_3$: 0 | Al$_2$O$_3$: 0.1 | Al$_2$O$_3$: 0.3 | Al$_2$O$_3$: 0.5 | Al$_2$O$_3$: 0.7 | Al$_2$O$_3$: 1 |
| | firing temperature (° C.) | | 1550 | 1550 | 1550 | 1550 | 1550 | 1550 |
| color | white | L* | 90.92 | 91.38 | 91.5 | 91.65 | 91.78 | 92.09 |
| degree | background | a* | −1.96 | −1.73 | −1.67 | −1.8 | −1.67 | −1.59 |
| | | b* | 4.51 | 4.54 | 4.34 | 4.82 | 4.34 | 4.04 |
| | black | L* | 75.03 | 76.17 | 78.41 | 80.23 | 81.88 | 83.96 |
| | background | a* | −1.71 | −1.61 | −1.63 | −1.81 | −1.64 | −1.64 |
| | | b* | 0.49 | 0.44 | 0.3 | 1.08 | 1.01 | 1.26 |
| | ΔL | | 15.89 | 15.21 | 13.09 | 11.42 | 9.9 | 8.13 |

TABLE 29

Example 29

| | | | sample 111 | sample 112 | sample 113 | sample 114 | sample 115 | sample 116 |
|---|---|---|---|---|---|---|---|---|
| | Y$_2$O$_3$ (mol %) | | 5.5 | 5.5 | 5.5 | 5.5 | 5.5 | 5.5 |
| | shielding material (%) | | SiO$_2$: 0 | SiO$_2$: 0.1 | SiO$_2$: 0.3 | SiO$_2$: 0.5 | SiO$_2$: 0.7 | SiO$_2$: 1 |
| | firing temperature (° C.) | | 1550 | 1550 | 1550 | 1550 | 1550 | 1550 |
| color | white | L* | 90.92 | 91.84 | 92.24 | 92.71 | 93.02 | 93.19 |
| degree | background | a* | −1.96 | −1.59 | −1.58 | −1.47 | −1.49 | −1.51 |
| | | b* | 4.51 | 4.33 | 3.9 | 3.4 | 3.49 | 3.37 |

TABLE 29-continued

Example 29

| | | sample 111 | sample 112 | sample 113 | sample 114 | sample 115 | sample 116 |
|---|---|---|---|---|---|---|---|
| black background | L* | 75.03 | 80.37 | 85.87 | 87.53 | 88.64 | 89.47 |
| | a* | −1.71 | −1.7 | −1.76 | −1.58 | −1.74 | −1.64 |
| | b* | 0.49 | 0.39 | 1.23 | 1.24 | 1.57 | 1.8 |
| ΔL | | 15.89 | 11.47 | 6.37 | 5.18 | 4.38 | 3.72 |

TABLE 30

Example 30

| | | | sample 117 | sample 118 | sample 119 | sample 120 | sample 121 | sample 122 |
|---|---|---|---|---|---|---|---|---|
| $Y_2O_3$ (mol %) | | | 5.5 | 5.5 | 5.5 | 5.5 | 5.5 | 5.5 |
| shielding material (%) | | | $TiO_2$: 0 | $TiO_2$: 0.1 | $TiO_2$: 0.3 | $TiO_2$: 0.5 | $TiO_2$: 0.7 | $TiO_2$: 1 |
| | | | NiO: 0.0225 | NiO: 0.0225 | NiO: 0.0225 | NiO: 0.0225 | NiO: 0.0225 | NiO: 0.0225 |
| | | | Z300: 0.036 | Z300: 0.036 | Z300: 0.036 | Z300: 0.036 | Z300: 0.036 | Z300: 0.036 |
| firing temperature (° C.) | | | 1550 | 1550 | 1550 | 1550 | 1550 | 1550 |
| color degree | white background | L* | 90.63 | 91.12 | 91.12 | 91.36 | 91.37 | 91.5 |
| | | a* | −1.92 | −1.73 | −1.74 | −1.76 | −1.61 | −1.62 |
| | | b* | 5.11 | 4.71 | 4.81 | 4.88 | 4.64 | 4.73 |
| | black background | L* | 74.28 | 75.43 | 77.21 | 78.59 | 79.95 | 81.63 |
| | | a* | −1.83 | −1.47 | −1.53 | −1.48 | −1.49 | −1.59 |
| | | b* | 0.65 | 0.69 | 1.02 | 1.21 | 1.36 | 1.81 |
| ΔL | | | 16.35 | 15.69 | 13.91 | 12.77 | 11.42 | 9.87 |

TABLE 31

Example 31

| | | | sample 123 | sample 124 | sample 125 | sample 126 | sample 127 | sample 128 |
|---|---|---|---|---|---|---|---|---|
| $Y_2O_3$ (mol %) | | | 6 | 6 | 6 | 6 | 6 | 6 |
| shielding material (%) | | | $TiO_2$: 0 | $TiO_2$: 0.1 | $TiO_2$: 0.3 | $TiO_2$: 0.5 | $TiO_2$: 0.7 | $TiO_2$: 1 |
| | | | NiO: 0.0225 | NiO: 0.0225 | NiO: 0.0225 | NiO: 0.0225 | NiO: 0.0225 | NiO: 0.0225 |
| | | | Z300: 0.036 | Z300: 0.036 | Z300: 0.036 | Z300: 0.036 | Z300: 0.036 | Z300: 0.036 |
| firing temperature (° C.) | | | 1550 | 1550 | 1550 | 1550 | 1550 | 1550 |
| color degree | white background | L* | 71.14 | 71.49 | 71.73 | 72.07 | 72.53 | 72.33 |
| | | a* | 4.25 | 4.08 | 3.67 | 3.06 | 2.44 | 1.92 |
| | | b* | 35.55 | 33.55 | 29.48 | 27.06 | 24.57 | 20.82 |
| | black background | L* | 61.37 | 63.13 | 65.46 | 67.07 | 68.44 | 68.44 |
| | | a* | 0.24 | 0.22 | 0.15 | −0.03 | −0.25 | −0.25 |
| | | b* | 25.33 | 24.43 | 22.37 | 21.12 | 19.73 | 17.66 |
| ΔL | | | 9.77 | 8.36 | 6.27 | 5 | 4.09 | 3.89 |

Each disclosure of the above identified Patent Literature is incorporated into the present application by reference. The zirconia composition, zirconia semi-sintered body and zirconia sintered body, as well as dental product of the present invention are explained based on the exemplarly embodiments above, but not being limited to the exemplarly embodiments above. A series of deformations, modifications and improvement may be applied to variety of disclosed elements (including each element in each claim, each element in each exemplarly embodiment or example, each element in each figure, and the like) within the context of entire disclosure of the present invention, based on fundamental technical idea of the present invention. In addition, various combinations, replacements, or selection of variety of disclosed elements (including each element in each claim, each element in each exemplarly embodiment or example, each element in each figure, and the like) may be made within scope of entire disclosure of the present invention.

Further problems, objections and development modes of the present invention are apparent from entirely disclosed matters of the present invention including Claims.

With respect to numerical values and ranges disclosed in the present application, it should be interpreted that all numerical values or small ranges included in the ranges are specifically disclosed even if there are no explicit disclosure.

With respect to definitions for the zirconia composition, zirconia semi-sintered body and zirconia sintered body, as well as dental product, if definitions in any structures or properties other than above disclosed one are required, definitions according to these producing methods may be taken into account.

Part or all of the above described exemplary embodiments may be expressed as following modes, but not limited thereto.

[Mode 1]
A partially stabilized zirconia sintered body containing 4 mol % to 7 mol % of yttria as stabilizer: wherein
assume that:
L* value for color degree in L*a*b* color system measured on white background is defined as first L* value;
L* value for color degree in L*a*b* color system measured on black background is defined as second L* value; and
in a case where a value calculated by subtracting the second L* value from the first L* value,
ΔL of a first region is larger than ΔL of a second region.

[Mode 2]
The zirconia sintered body of the modes wherein the ΔL of the first region is larger than ΔL of the second region by 0.8 or more.

[Mode 3]
The zirconia sintered body of the modes wherein ΔL of the second region is 7.5 or less.

[Mode 4]
The zirconia sintered body of the modes: wherein
the zirconia sintered body contains a shielding material;
a content ratio of the shielding material in the second region is higher than a content ratio of the shielding material in the first region.

[Mode 5]
The zirconia sintered body of the modes: wherein
ΔL of the first region is 8 to 12;
ΔL of the second region is 4 to 11.

[Mode 6]
The zirconia sintered body of the modes: wherein
difference between a content ratio of yttria in the first region and a content ratio of yttria in the second region is 1 mol % or less.

REFERENCE SIGNS LIST

100, 200, 300 zirconia sintered body, zirconia formed composition, zirconia semi-sintered body
101 first region
102 second region
103 third region
104 fourth region
201 dental prosthesis
202 abutment tooth
203 gum

The invention claimed is:

1. A partially stabilized zirconia sintered body, comprising from 4 mol % to 7 mol % of yttria as a stabilizer, wherein
the zirconia sintered body comprises a light shielding material,
the zirconia sintered body comprises a first region, and a second region having a higher content ratio of the light shielding material than the first region,
a difference between a content ratio of yttria in the first region and a content ratio of yttria in the second region is 1 mol % or less,
a L* value of color degree in a L*a*b* color system measured on white background is defined as a first L* value,
the L* value of color degree in the L*a*b* color system measured on black background is defined as a second L* value, and
ΔL of the first region is larger than ΔL of the second region, wherein a value calculated by subtracting the second L* value from the first L* value is defined as ΔL.

2. The partially stabilized zirconia sintered body according to claim 1, wherein ΔL of the first region is by 0.8 or more larger than ΔL of the second region.

3. The partially stabilized zirconia sintered body according to claim 1, wherein ΔL of the first region is from 8 to 12 and ΔL of the second region is from 4 to 11.

4. The partially stabilized zirconia sintered body according to claim 1, wherein ΔL of the second region is 7.5 or less.

5. The partially stabilized zirconia sintered body according to claim 1, wherein the first region and the second region are laminated.

6. The partially stabilized zirconia sintered body according to claim 1, wherein:
the zirconia sintered body further comprises a third region between the first region and the second region, and
ΔL of the third region is larger than ΔL of the second region and smaller than ΔL of the first region.

7. The partially stabilized zirconia sintered body according to claim 6, wherein a content ratio of the light shielding material in the third region is higher than a content ratio of the light shielding material in the first region and lower than a content ratio of the light shielding material in the second region.

8. The partially stabilized zirconia sintered body according to claim 6, wherein:
the zirconia sintered body further comprises a fourth region between the third region and the second region, and
ΔL of the fourth region is larger than ΔL of the second region and smaller than ΔL of the third region.

9. The partially stabilized zirconia sintered body according to claim 8, wherein a content ratio of the light shielding material in the fourth region is higher than the content ratio of the light shielding material in the third region and lower than the content ratio of the light shielding material in the second region.

10. The partially stabilized zirconia sintered body according to claim 8, wherein with respect to thickness in a laminated direction of each region,
a thickness of the first region is from 30% to 40% of a total thickness,
a thickness of the second region is from 30% to 40% of the total thickness,
a thickness of the third region is from 10% to 20% of the total thickness, and
a thickness of the fourth region is from 10% to 20% of the total thickness.

11. The partially stabilized zirconia sintered body according to claim 1, wherein the light shielding material is at least one selected from a group consisting of silicon oxide, aluminium oxide, titanium oxide, a complex oxide of zirconium and silicon, a coloring agent and a fluorescence agent.

12. The partially stabilized zirconia sintered body according to claim 1, wherein the partially stabilized zirconia contains 5.3 mol % to 6.2 mol % of yttria as the stabilizer.

* * * * *